Aug. 19, 1952   F. E. DULMAGE   2,607,077
MIXING TORPEDO FOR PLASTICS EXTRUDERS
Filed June 28, 1951                              2 SHEETS—SHEET 1
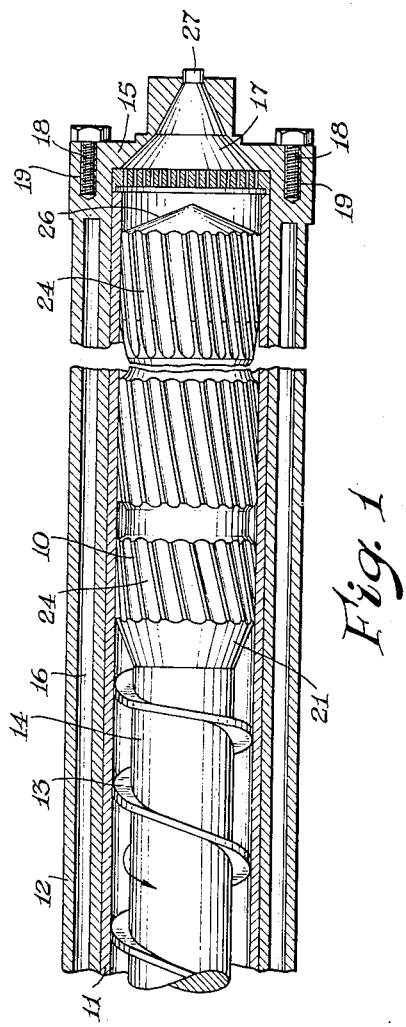
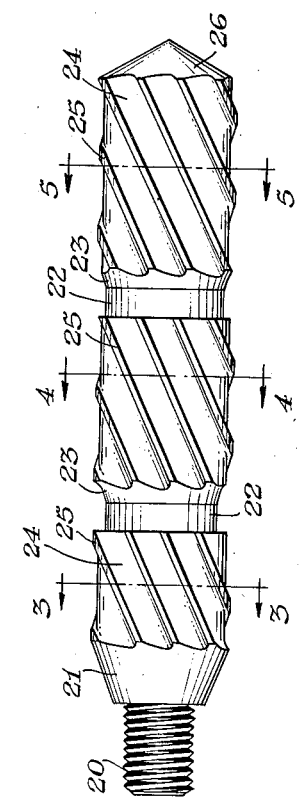
INVENTOR.
Frederick E. Dulmage
BY
Griswold & Burdick
ATTORNEYS.

INVENTOR.
Frederick E. Dulmage
BY
Griswold & Burdick
ATTORNEYS.

Patented Aug. 19, 1952

2,607,077

UNITED STATES PATENT OFFICE 2,607,077

MIXING TORPEDO FOR PLASTICS EXTRUDERS

Frederick E. Dulmage, Saginaw, Mich., assignor to The Dow Chemical Company, Midland, Mich., a corporation of Delaware Application June 28, 1951, Serial No. 233,995

3 Claims. (Cl. 18—12)

This invention relates to an improved torpedo for plastics extrusion machines, and particularly to a plasticating, mixing and homogenizing device for use in such extruders.

Various means have been used to blend organic thermoplastics with such modifying materials as plasticizers, lubricants, pigments or dyes, and the like. This has often required the use of a plurality of machines such as dry mixers, compounding rolls, various types of kneaders or masticators, and other diverse machines. This is costly, time consuming, and each handling of the material increases the chances of contamination. To overcome this problem, various attempts have been made to effect the mixing and homogenizing in the extrusion device itself. Since most such machines are worm-fed, and since a feed worm is fundamentally inefficient as a mixer, the suggestions have usually involved complex baffling attachments to create turbulence and mixing where none normally occurs. These devices create inordinately large back pressures, and uneconomical amounts of work are required to drive the worm. They do not avoid or overcome the common pulsations of a screw-fed extruder. Further, it has usually been necessary to put the extruded mix through the machine two or three times to effect the desired blending and to realize the uniformity previously obtained with compounding mills, and each pass through the extruder has had to be followed by a cutting, chopping or grinding step to give a suitable granular feed for the next pass. Such multiple-pass treatments may require the plastic, especially if heat-sensitive, to remain heated long enough to induce degradation or oxidative discoloration.

It is accordingly among the objects of the present invention to provide a means, operable in conjunction with an extrusion device, for blending a plastic mix to a state of homogeneity in a single pass through the extruder. A related object is to provide such a means which will not offer increased resistance to flow of material through the extruder, and hence, which will not increase the power requirements of the extruder. A further object is to provide a novel and efficient mixing torpedo, adapted to be used in standard plastics extrusion apparatus. Another object is the provision of such a mixing torpedo which can be used without changing the barrel of a standard extrusion machine and with only simple changes being required in the worm of such machine. An additional object is to modify a screw-fed extruder to avoid or overcome the usual surges and pulsations in the delivery rate of such machines.

According to my prior U. S. Patent 2,453,088, the foregoing objects could be attained through the provision of a simple elongated cylindrical torpedo, adapted to be secured coaxially to the forward end of a shortened worm of an extruder and fitting rotatably within and occupying from about ¼ to about ½ the length of the cylindrical sleeve of the extruder, the torpedo having a plurality of equally spaced helical grooves with rounded bottoms in its cylindrical surface, said grooves having the same hand as the feed worm and having a lead of from ½ to 2 times the length of the torpedo, there being also provided a plurality of spaced neck-like circumferential constrictions along the torpedo, of the same depth as the said helical grooves, the constrictions representing abrupt decreases in diameter of the torpedo at their feed ends and gradual returns to the original diameter at their discharge or forward ends, the combined capacities of the helical grooves and circumferential constrictions being at least as great as the delivery capacity of the said coaxial feed worm.

Experience has shown that, while the above-described prior torpedo effects a greater homogenizing action on plastic dry mixes than has been possible before with any single piece of extrusion apparatus, it still has certain shortcomings which leave room for improvement in attaining the general objects of the invention. Thus, the lands between the round-bottomed grooves of the prior torpedo are all the same radius and hence provide exactly the same shearing action, or freedom from shearing, on any film of plastic on the barrel of the extruder. Consequently, the plastic which is advanced along each groove is mixed to a reasonable state of uniformity within that groove, but may have a different composition from that in other grooves as there is negligible interchange between material in the various grooves. Some blending and further homogenizing occurs in the neck-like constrictions between the grooved sections of the torpedo, but further improvement is possible.

It is accordingly a further object of the present invention to provide a mixing torpedo for use in plastics extruders which is more efficient than, and is an improvement on, the torpedo of my prior Patent No. 2,453,088. Additional objects may appear from the following description.

The improved torpedo of the present invention is adapted to be secured coaxially to the forward end of a shortened worm of an extruder. It fits rotatably within the cylindrical barrel of the extruder, and occupies about ¼ to ½ of the length of the barrel. As in the prior device, the present torpedo has a plurality of equally spaced helical grooves in its cylindrical surface. The grooves have the same hand as the feed worm of the extruder and have a lead length of ½ to 2 times the length of the torpedo. The torpedo is divided longitudinally into several sections by a plurality of neck-like constrictions along the torpedo representing abrupt decreases in the diameter of the torpedo to the depth of the grooves at their feed end and gradual increases to the original diameter at their discharge or forward ends. The new torpedo differs from the prior one, however, in the shape of the grooves, and in having the various lands disposed about its periphery of different radii in certain parts of its length, as well as by having the grooves in the successive sections of decreasing depth, as will be described more fully.

In the new torpedo, the grooves do not have rounded bottoms, i. e., in cross-section they do not represent sections of a circle. Instead, the leading side of each groove is straight and lies on the radius of the torpedo. The groove, in cross-section, resembles the letter L, with the said leading side being the short leg of the L, and the longer trailing side being arcuate, with a radius approximating that of the torpedo and with its center of curvature lying outside of the torpedo. The grooves in each section of the torpedo have the same circular pitch as those in every other section, but those in the section nearest the feed end of the torpedo are deeper than those in the next section, each successive section of the torpedo toward the discharge end having shallower grooves than the preceding sections. Regardless of their different depths, the grooves in all sections have the following identical features. Their leading side lies on a radius of the torpedo and forms the trailing side of one land; their arcuate side extends from a point on that radius to a point near the circumference of the torpedo which is on the leading edge of the next land; the said arcuate side has approximately the same radius of curvature as does the torpedo, but with its center outside the torpedo; and, all grooves in all sectoins have the same width on the circumference of the torpedo.

The lands in the discharge section of the torpedo all have the same radii, and hence the same clearance from the surrounding concentric barrel. In prior sections of the torpedo, however, the lands are divided symmetrically into three groups. One group of lands (the third, sixth, ninth, etc., in the order of rotation) has a greater radius than the others, and thus has the least clearance within the working barrel. Another group (the first, fourth, seventh, etc.) has a smaller diameter than any of the others, and has the greatest radial clearance from the barrel. The intermediate group of lands (the second, fifth, eighth, etc.) has a radius greater than that of the first described group and less than that of the second group described. Thus, if the lands in the discharge section have about 0.006 inch radial clearance from the cylindrical barrel, those in the other sections of the torpero may have radial clearances of 0.006 inch in the first group, 0.011 inch in the intermediate group and 0.016 inch in the other group. Thus, in rotation of the torpedo within the barrel, plastic which rolls on to the barrel wall, past one of the lands having greatest clearance, is scraped partially from the wall by the succeeding land having intermediate clearance, and most of the remainder is scraped from the wall by the succeeding land having minimum clearance. In this manner, material is transferred from the mass in one groove to that in other grooves in the same section of the torpedo, and mixing is augmented by the amount of such transfer.

The invention will now be described with reference to the accompanying drawing, wherein Fig. 1 is a longitudinal section through part of the barrel of a standard plastics extruder, showing the feed worm or screw and the new torpedo in elevation;

Fig. 2 is an enlarged elevation of the torpedo;

Figure 5:
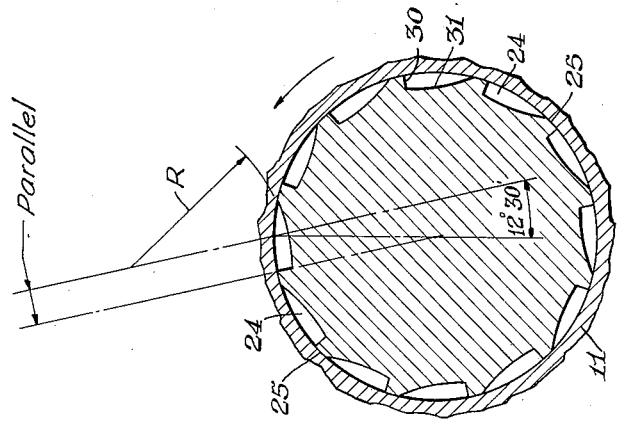
Fig. 5 is a similar section taken along line 5—5 of Fig. 1.

The torpedo 10 of the present invention is used in the cylindrical barrel 11 of a standard, usually horizontal, extrusion machine 12, and is a coaxial extension of a shortened feed screw 13 of conventional type. Screw 13 usually, but not necessarily, has a root 14 at least half the diameter of barrel 11, and is ordinarily of the compression type, with a diminishing lead on successive flights of the screw. Torpedo 10 is suitably from one-quarter to one-half the length of the extruder barrel 11, from the hopper (not shown) to the head 15. Typically, the barrel 11 is surrounded by chamber 16, for heating or cooling, as required. Beyond torpedo 10, in the extrusion path, is a screen or strainer 17, held in place across the discharge end of barrel 11 by head 15, which is secured to the body of extruder 12 by means of bolts which may be inserted or withdrawn through bolt holes 18 and tapped sockets 19. Head 15 may be of any desired form, and may be straight (as shown) or of the gooseneck or L varieties. Any desired type of extrusion orifice 27 or orifices may be used.

The essential feature of the invention is the torpedo 10, which is shown in one typical conformation in Fig. 2. The body of torpedo 10 is of a diameter enough smaller than the bore of barrel 11 to leave a working clearance between the two members. A stud 20, coaxial with the torpedo 10, of a diameter less than that of the root 14 of screw 13, is threaded of the same hand as the direction of rotation of the screw 13 and torpedo 10, so as to maintain a tight coupling between the two when said stud is turned into a socket (not shown) provided for that purpose in the forward end of the shortened screw 13. A tapered circumferential shoulder 21 is provided between the torpedo body and the root 14 of screw 13, to furnish a smooth approach over which plastic material may be forwarded as it leaves the screw. At least one, and usually from two to five, circumferential necks 22 are provided at regularly spaced intervals along torpedo 10, and each neck 22 adjoins a tapered shoulder 23 at its forward or delivery end to furnish a smooth and gentle return from the lesser diameter of neck 22 to the greater body diameter of torpedo 10. For most efficient operation, the angle of taper is between about 12° and 20°, though angles as high as 30° may be used. Disposed helically about the torpedo 10 is a series of skewed grooves 24. Grooves 24 furnish continuous smooth passageways from one neck 22 to the next. The right helicoid grooves 24 are of opposite hand to the rotation of the screw 13 and torpedo 10, i. e. they have the same hand as the flights of screw 13, and have a lead length which may vary from one-half to two times the length of the torpedo. In the modification illustrated, grooves 24 have a lead 1.3 times the length of torpedo 10.

Figure 4:
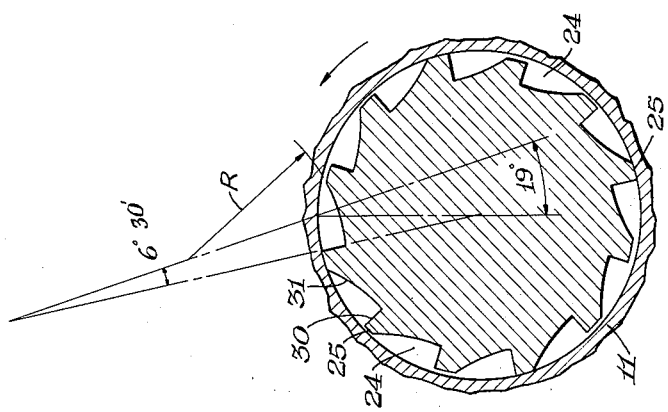
Fig. 4 is a similar section taken along line 4—4.
Figure 3:
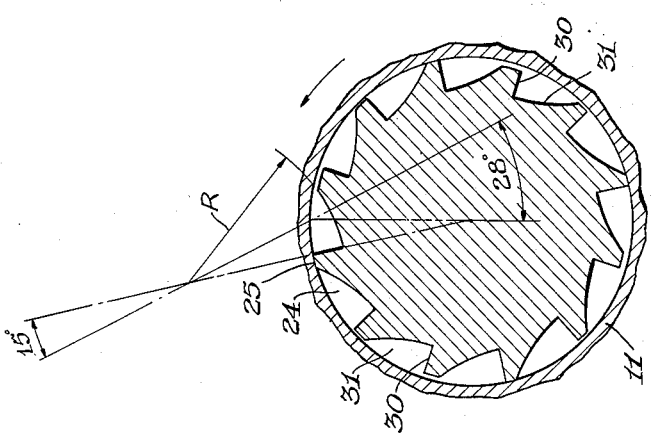
Fig. 3 is a cross-sectional view of the torpedo taken along line 3—3 of Fig. 1.

In the illustrated embodiment, torpedo 10 has two circumferential necks 22, dividing the torpedo into three sections, in each of which the helical grooves 24 and intervening lands 25 have the characteristics previously defined, as is shown in the respective cross-sectional views of Figs. 3–5. The grooves 24 in the feed section of torpedo 10 are shown in Fig. 3. The leading face 30 of each groove 24 lies on a radius of the torpedo 10. The arcuate face 31 of each groove 24 has a radius R approximately equal to that of torpedo 10, or of the barrel 11 in which the torpedo is housed. In the said first or feed section, the rake of the leading face 30 of each groove 24, relative to a line normal to its arcuate face 31 is about 15°. Similarly, a line normal to arcuate face 31 of each groove 24 forms an angle of about 28° with the radius of torpedo 10 passing through the midline of the groove opening. Torpedo 10 is illustrated as having twelve grooves and a like number of lands. Each third land 25 has only working clearance within barrel 11, while the preceding land, in the direction of rotation, has a greater clearance and the one ahead of that has still greater clearance within the barrel.

Referring to Fig. 4, the grooves 24 in the center section of torpedo 10 are seen to be of the same open width as those in the feed section. In the center section, the difference between grooves 24 from those in the feed section is that the rake of the leading face 30 of each groove 24, relative to a line normal to the arcuate face 31, is only about 6° 30', while the line normal to said arcuate face 31 forms an angle of about 19° with the radius of torpedo 10 which passes through the midline of the groove opening. Consequently, grooves 24 are shallower in the center section than in the feed section. Successive lands 25 in the center section are stepped, as are those in the feed section.

Fig. 5 illustrates the shape of grooves 24 and of lands 25 in the discharge section of torpedo 10. In this section, the grooves 24 have the same open width as those in the preceding sections, but are shallower than those in either of the previously discussed sections of the torpedo. This difference is attained by reducing the rake of the leading face 30 of each groove 24 to 0°, and by reducing the angle between a line normal to the arcuate face 31 and the radius of the torpedo which passes through the midline of the groove opening to about 12° 30'.

Whereas the rounded grooves and uniformly high lands of the torpedo described in my prior Patent No. 2,453,083 confined the mixing action mainly to the material held in each groove by the close-fitting cylindrical barrel, augmented by the interchange of material occurring in the neck-like constrictions along the torpedo, the skewed grooves of the torpedo of this invention, and the stepped lands in all but the terminal section thereof, cause a much more thorough mixing to occur, both because of a greater milling action within each groove and because of the partial transfer of material from one groove to the next due to the graded clearances between the lands and the barrel.

In operation, the extruder 12 is heated by steam in chamber 16 and the desired ingredients of the final mix are fed to screw 13, suitably from or through a hopper (not shown). The screw 13 and its coaxial extension, torpedo 10, are set in motion by a motor-driven gear (not illustrated) in the conventional manner. In the illustrated modifications, rotation is to the right, since screw 13 and grooves 24 are both left handed. Initial fusion and preliminary, non-uniform mixing occurs as the feed is advanced by the screw toward the torpedo. When the feed reaches the torpedo it is advanced outwardly over shoulder 21 to the entrances to grooves 24, among which it is evenly distributed. Examination has shown that continued rotation of torpedo 10, when grooves 24 are filled with plastic, results in unique agitation of the mass. Apparently, friction between the barrel 11 and the plastic in grooves 24 causes that plastic to roll within the groove, both axially of the groove, with a leftward rotation, and forwardly along the groove. The mass in each groove becomes thoroughly mixed. There is continuous exchange between the rotating mass of plastic in the grooves and that which forms the film between the lands and the barrel. Thus, as the shortest land in each set of stepped lands in the first and second sections of the torpedo, moves past the cylinder wall in its rotation, it leaves behind a thick coating of the plastic material. A land of intermediate height follows after the short land and the mass of rotating plastic preceding such intermediate land picks up the coating just left by the short land. The intermediate land spreads a somewhat thinner film on the cylinder wall, which is similarly picked up and mingles with the plastic which is being pushed along by the third land, having the least radial clearance. Thus, mixing occurs in each groove due to a combination of the previously described rotation of the contained plastic mass, with the squeezing or milling action due to the diminishing clearance between the bottom of each groove and the barrel, the smearing action of the stepped lands, and the pickup by the material in each groove of material left on the cylinder wall by the mass in other grooves. As the several grooves 24 discharge their loads into the pockets between necks 22 and barrel 11 a further mixing and homogenizing action occurs. There is at this point a tendency for the mass to form a collar or series of collars about neck 22. This tendency is continuously interrupted by the further discharge of numerous streams of fresh plastic from the helical groves. These streams perforate and rupture the collar-like rings of material around the neck 22, mingling therewith, and their entry forces a like amount of material forward into the next set of groove segments, where the process is repeated, and further mixing occurs. Because the grooves 24 in each section of the torpedo are shallower than those in prior sections, the linear velocity of the plastic mass increases as it moves toward the discharge end of the machine.

When the plastic streams are finally discharged beyond torpedo head 26, their continued right-hand mass revolution and left-hand individual rotation causes further mixing. The mass is then displaced forwardly through screen 17 and thence out through extrusion head 15 and its orifice 27. Extrusion occurs substantially without pulsation. Thereafter the extruded material is handled in the usual manner.

In a specific embodiment, the illustrated 3- section torpedo was constructed to fit in the barrel of an extruder having an internal diameter of 2.500 inches. The diameter of the highest lands in the first two sections, and of all lands in the final section, was 2.488 inches, leaving a radial clearance of 0.006 inch or a total clearance of about 5 mils per inch of diameter. Intermediate lands had a radial clearance of 0.011 inch (about 9 mils per inch of diameter), and the lowest lands had radial clearance from the barrel of 0.016 inch, or a total clearance of about 13 mils per inch of diameter. The grooves in the feed section had a root diameter of 1.998 inches, or a depth beneath the highest lands of 0.245 inch. Those in the center section had a root diameter of 2.123 inches, or a depth beneath the highest lands of 0.183 inch. The grooves in the discharge section had a root diameter of 2.248 inches, or a depth of 0.120 inch. The rake of the lands in each section was that shown on the drawing, diminishing from 15° in the feed section to nil in the discharge section.

Flake ethylcellulose was mixed in a banbury mixer with 16 per cent of di-tertiaryoctyl diphenyloxide plasticizer and 0.5 per cent pigment, and the resulting dry flakes were fed through the hopper of an extruder with a shortened feed screw and with the illustrated torpedo, 11½ inches long, at its forward end. The plastic was heated in the screw section by means of hot oil circulating through the jacket of the extruder at 365° F., and became thoroughly plastic before entering the torpedo section. It was extruded as a ribbon 3 inches wide and 0.063 inch thick at the rate of 34 pounds per hour. Extrusion occurred without pulsation, and the product was uniformly colored, showing no striations and being free from bubbles and other imperfections, showing that air and other volatile matter had been voided back through the hopper. Attempts to extrude the same mixture through a conventional screw extruder were unsuccessful, and an extruder having the torpedo of prior Patent No. 2,453,088 gave steady production of a uniformly colored ribbon which, however, had many included bubbles and a rough surface in comparison with the product obtained when using the torpedo of the present invention.

I claim:

1. In an extruder, in combination with a screw for advancing plastic feed along a cylindrical barrel: a cylindrical mixing torpedo beyond the screw, coaxial and continuous therewith, rotatable within the barrel, and divided into sections by a plurality of circumferentially disposed neck-like constrictions at intervals along the torpedo; a plurality of evenly spaced helically disposed skewed grooves and intervening lands of the same hand as the said screw and a lead of from ½ to 2 times the length of the torpedo, all grooves in each section of the torpedo being of equal depth, but with those in each section after the first being shallower than those in preceding sections, each circumferential neck being of the depth of the grooves feeding that neck and being bevelled at its discharge end from the root diameter of its feed grooves to the maximum land diameter of the succeeding section; the lands in the discharge section of the torpedo all having the same working clearance from the surrounding barrel, while those in all prior sections of the torpedo are stepped, in the order of rotation, a first set comprising a number of evenly spaced lands having much greater than a minimum working clearance, succeeding sets of evenly spaced lands, intervening between those of the first set, having successively greater radii, the last such set of lands having the same radius as all lands in the discharge section; the short side of each of said skewed grooves being the leading side of its groove and lying on a radius of the torpedo, while the long side of each such groove is arcuate, extending from a point on said radius to the leading edge of the succeeding land, having a radius of curvature approximating the radius of the torpedo and with its center of curvature outside of the torpedo.

2. The extrusion apparatus claimed in claim 1, wherein the torpedo is further characterized by having all of the lands in the discharge section with a working clearance of about 5 mils per inch of diameter; one-third of the lands in each of the other sections, evenly spaced about the torpedo, of the same height as those in the discharge section; another third of the lands in said other sections, immediately preceding the first third of said lands in order of rotation, having a clearance of about 9 mils per inch of diameter of the torpedo; and, the remaining third of the lands in said other sections, immediately following the first third of said lands in order of rotation, having a clearance of about 13 mils per inch of diameter.

3. The extrusion apparatus claimed in claim 1, wherein the torpedo is further characterized by being divided longitudinally into three sections, the leading face of the skewed grooves in the feed section having a rake of about 15° relative to a line normal to the arcuate face of the groove, while the corresponding angle of rake in the center section is about 6° 30' and that in the discharge section is about 0°; and, a line normal to the arcuate face of the grooves in the feed section forms an angle of about 28° with the radius of the torpedo drawn through the midline of the groove opening, while the corresponding angle in the center section is about 19° and that in the discharge section is about 12° 30'.

FREDERICK E. DULMAGE.

No references cited.